No. 881,746.  
PATENTED MAR. 10, 1908.
J. M. TOWNE.  
HOSE COUPLING.  
APPLICATION FILED SEPT. 22, 1902.
Fig. I.
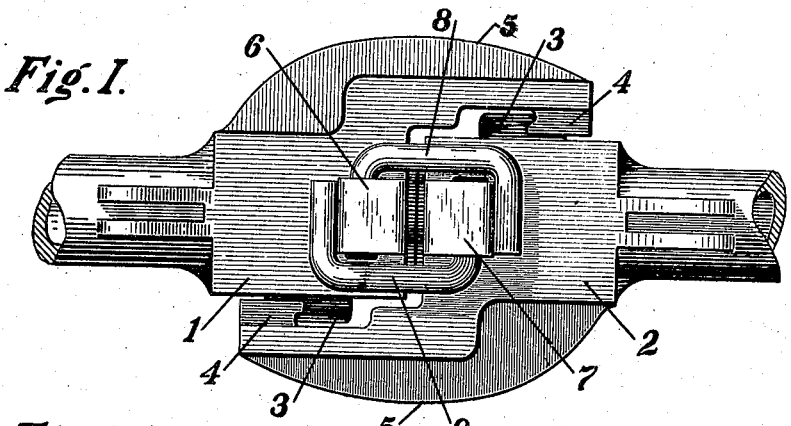
Fig. II.
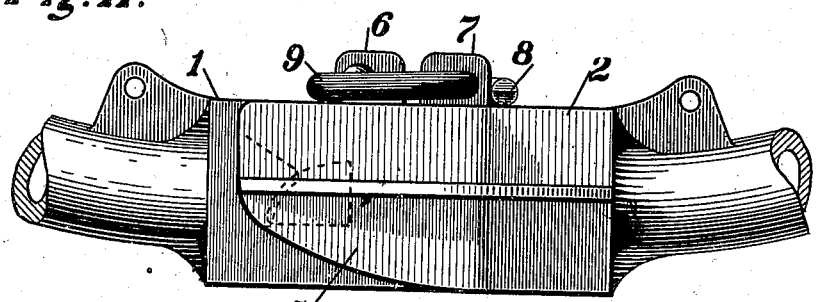
Fig. III.
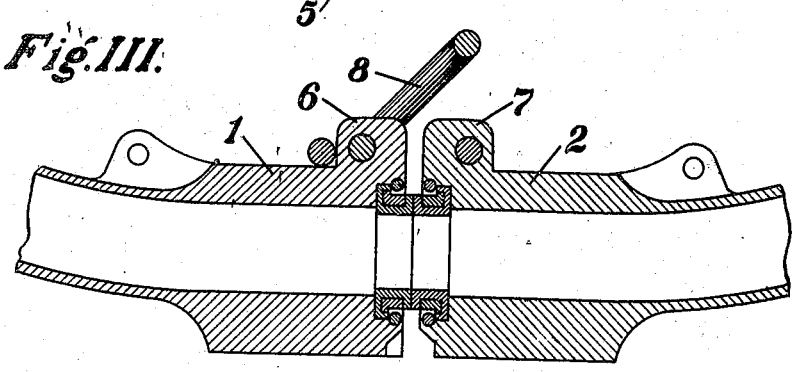

UNITED STATES PATENT OFFICE.

JOSEPH M. TOWNE, OF EAST ORANGE, NEW JERSEY, ASSIGNOR TO SAFETY CAR HEATING & LIGHTING COMPANY, A CORPORATION OF NEW JERSEY.

HOSE-COUPLING.

No. 881,746.  Specification of Letters Patent.  Patented March 10, 1908.

Application filed September 22, 1902. Serial No. 124,415.

*To all whom it may concern:*

Be it known that I, JOSEPH M. TOWNE, of East Orange, in the county of Essex, State of New Jersey, have invented certain new and useful Improvements in Hose-Couplings, of which the following is a complete specification, reference being had to the accompanying drawings.

The object of my invention is to produce improvements in two-part straight port hose couplers, whereby the two parts may be locked together to prevent uncoupling when it is desired to have them hold together.

In the accompanying drawings:—Figure I is a top plan view of a two-part hose coupler provided with my locking device. Fig. II is a side elevation of the subject matter of Fig. I. Fig. III is a central longitudinal section, as of Fig. I, showing one of the locking members engaged in the locking position, and the other elevated out of such position.

Referring to the numerals on the drawing, 1 indicates one part of a hose coupling and 2 the other part thereof, of a type well known in use, and which are in practice made interchangeable. Each is provided with a lug 3, with which a lug 4, projecting from a wing 5 on the other, engages to hold the two parts in the coupled position. When the two parts are united to hose terminals and to each other, respectively, so as to hang in the position, shown for example in Fig. II, they hold together by reason of their own weight and relative structure, but if they be lifted from below, they tend to turn one upon the other, and to become uncoupled. Such a lifting of two coupled members in practice might inadvertently occur and produce accidental uncoupling, and that my device is designed to prevent. I accordingly provide upon the parts 1 and 2, respectively, bosses 6 and 7. In the boss 6, I provide a U-shaped hook 8, and in the boss 7, a corresponding hook 9. One leg of each hook is movably fixed within its respective boss, while the free leg thereof is adapted by the movement of the hook to engage the boss of the adjacent part of the coupling, when the two parts are in the relative positions shown in the drawing.

It is obvious that one hook would perform the required function of locking the parts together, but a hook on each boss is provided in order to preserve the interchangeable character of the two parts of the coupling above referred to.

It is not necessary in practice that the hook or hooks should engage closely with the boss or bosses, but only that they should hold the parts so closely together as to prevent sufficient rocking movement between the two parts to disengage them. When the two parts are to be designedly engaged or disengaged the hook or hooks are turned out of the way, and the coupler is manipulated in the usual manner.

It will accordingly be seen that I have provided a construction well adapted to attain the several ends and objects above pointed out in an exceedingly simple and efficient manner. The reciprocal parts of the coupler are held in tight engagement under all conditions of service and are prevented from being accidentally disengaged in the event of the hose sections becoming straightened out or tautened as, for instance, when the cars are traversing reverse curves. The reciprocal parts of the coupler may be easily disengaged by lifting the hooks from their respective bosses and then lifting the coupler bodily to disengage the mutually interlocking parts.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What I claim is:—

1. In a hose coupling of the class described, the combination with the two parts of the coupler each of which has a locking arm on one side and a locking projection upon the opposite side and adapted to couple by a downward swinging movement, of a boss upon each part, and hooks carried by the respective bosses, the hook on each boss being adapted to engage the other boss.

2. The combination with the two parts of a hose coupling of the class described, each of which has a locking arm on one side and a locking projection upon the opposite side, said parts being adapted to mutually engage with a downward swinging movement, of a boss upon each part and oppositely disposed U-shaped lugs upon the respective bosses, the hook on each boss being adapted to engage the other boss.

3. The combination with the two parts of a hose coupler of the class described, each of which has a locking arm on one side and a locking projection upon the opposite side, said parts being adapted to mutually engage through relative rocking movements thereof, of a locking device located above the steam joint between the parts, comprising a boss on each part and hooks upon the respective bosses, the hook on each boss being adapted to engage the other boss.

In testimony of all which I have hereunto subscribed my name.

JOSEPH M. TOWNE.

Witnesses:
GEORGE A. SAVOY,
EDWARD I. TOWNE.